Nov. 10, 1953
C. B. WRIGHT
2,658,706
SUPPORTING PIPE CLAMP
Filed Dec. 9, 1950
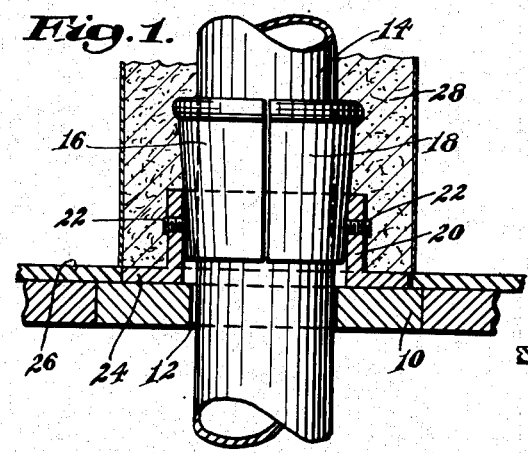
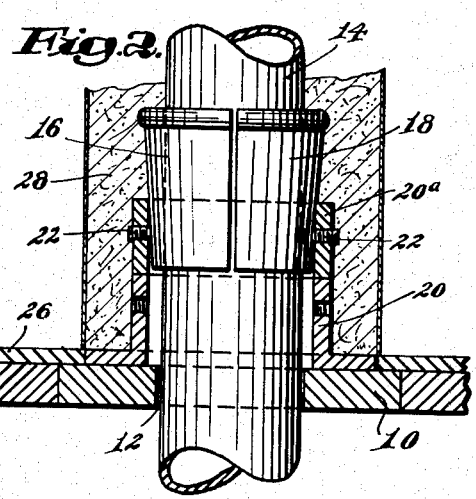
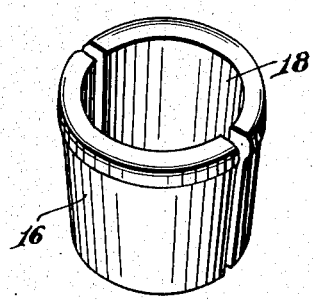
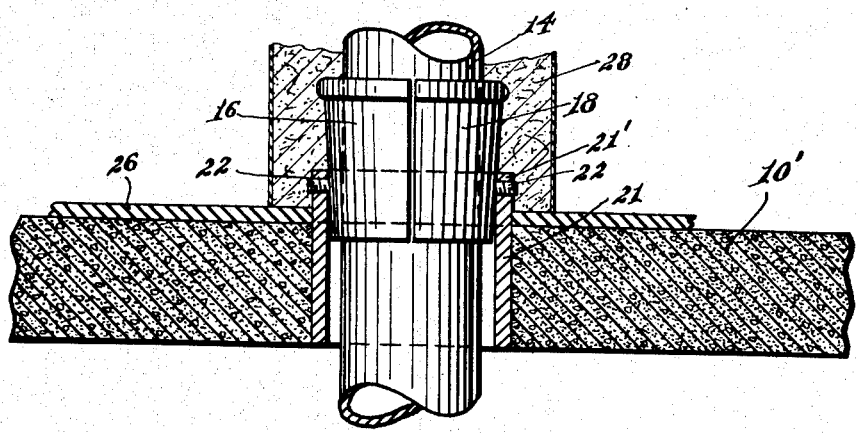
Inventor:
Clayton B. Wright,
by John H. McKenna
Attorney Patented Nov. 10, 1953

2,658,706

UNITED STATES PATENT OFFICE 2,658,706

SUPPORTING PIPE CLAMP

Clayton B. Wright, Malden, Mass.

Application December 9, 1950, Serial No. 200,011

4 Claims. (Cl. 248—56)

This invention relates to improvements in pipe clamps, and more particularly to clamps for supporting pipes at locations where the pipes extend through a floor or wall of a building, with or without provision for accommodating expansion and contraction of the pipes due to changes in ambient temperature or to changes in the temperature of a medium circulating within the pipes.

A current trend toward use of so-called stream-lined copper tubing for the circulatory conduits within buildings has introduced a problem to satisfactorily maintain the stream-lined effect at the supports for the larger diameter conduits where they pass through the building floors and walls without crushing or distorting the relatively easily deformable tubes.

Heretofore, the customary procedure for supporting copper tubing or the like of sizes which require support where they pass through floors and walls of buildings has been to employ two similar half-clamps bolted together in clamping relation to a pipe with the clamp resting on or against the floor or walls and with substantial oppositely extending lateral projections, through which the bolts extend, constituting awkward disfiguring elements. Although many such pipes have asbestos coverings thereon, it has not been feasible to cover and hide the clamp projections. Also, these prior clamps have interfered with the laying of floor coverings in neat surrounding relation to the pipes and clamps.

It is among the objects of my present invention to provide a supporting pipe clamp which effectively clamps and supports a pipe at a floor or wall region of a building without objectionable lateral projection and without interference with the laying of a floor covering in neatly surrounding relation to the clamp and pipe. According to the invention, a pair of exteriorly tapering pipe-clamping members coact with a circular sleeve element to effect clamping engagement between the pipe-clamping members and the pipe to be supported, with manually operable locking means for maintaining the said clamping engagement. The circular sleeve element may have a circular base flange thereon for resting against a floor or wall or the sleeve element may be fixed in a hole through the floor or wall with appreciable projection out of said hole within which projection the clamping members may be seated and locked in their clamping relation to a pipe extending through said hole and clamp. Where substantial expansion and contraction of the pipe is anticipated, the circular sleeve element may comprise two sleeve sections of which the section in which the pipe-clamping members are seated and locked rests loosely on the other sleeve section whereby the sleeve sections may have relative axial movements in response to expansion and contraction of the pipe.

Another object of the invention is to provide a supporting pipe-clamp all portions of which may be effectively and neatly covered and hidden by the usual asbestos pipe covering of customary thickness. The pipe clamps of the invention relatively closely surround the pipe which is being supported with no disfiguring lateral projections which cannot be effectively concealed within the customary asbestos pipe covering of conventional thickness.

A further object of the invention is to provide a supporting pipe clamp whose members and elements coact in a compact assembly which may be neatly and smoothly encircled by a floor covering without disfiguring mutilation of the floor covering.

It is, moreover, my purpose and object generally to improve supporting pipe clamps and more particularly such clamps which are adapted to support pipes and conduits which have relatively easily collapsible walls which must be protected against deformation by the clamping pressure and against chafing which may result from any looseness.

In the accompanying drawing:

Fig. 1 is an elevational view, partly in medial cross-section, showing a supporting pipe clamp embodying features of the invention, the clamp being in supporting clamping engagement with a pipe or tube extending through a floor of a building;

Fig. 2 is a view similar to Fig. 1 but showing a modified form of supporting pipe clamp embodying features of the invention;

Fig. 3 is a perspective view of the two exteriorly tapering pipe-clamping members of the clamps shown in Figs. 1 and 2; and Fig. 4 shows another modified form of supporting pipe clamp embodying features of the invention, the clamp being in supporting clamping engagement with a pipe or tube which extends through a sleeve element of the clamp which is fixed in a concrete floor of a building.

Referring to the drawing, the floor boards of a floor of a building are indicated at 10, one board having a hole 12 therethrough for loose passage of a pipe 14, through the floor. The pipe 14 may be one of the circulatory conduits of a building water, heating or air-conditioning system, or any other pipe requiring support at a region where it passes through a floor or wall of a building. However, the invention is particularly applicable for supporting such conduits made of so-called stream-lined copper tubing whose relatively thin walls offer relatively small resistance to deformation, as compared with cast iron or brass pipes, for example. Such copper tubing conduits may have substantially less exterior diameters as compared with iron and brass pipes of the same or smaller interior diameters, and they enter more satisfactorily into present-day stream-lining effects as compared with the more bulky and much heavier conventional varieties of piping. However, because of the easily deformable character of the copper tubing conduits, various well known types of pipe clamps have proven unsuitable for use in supporting the copper tubing conduits, with the result that such conduits quite universally have been supported by the ordinary split pipe-clamps whose two halves are bolted together around a copper tube with the bolts passing through oppositely extending substantial lateral projections which are unsightly and not readily concealed by conventional pipe-covering procedures. In addition to destroying any continuity of stream-lined effect, the prior clamps objectionably interfere with the attainment of any neat and smooth laying of floor covering material around the conduit and its supporting clamp.

According to the invention, the illustrated pipe 14 may be a copper tube which may be protectively clamped and supported within a pair of clamping members 16, 18, with the clamping pressure distributed over an axially relatively wide surface area which extends substantially all around the circumference of the tube. Each of the clamping members 16, 18 has exterior taper in axial direction, and the smaller ends of the members extend into a cylindrical sleeve element 20 which acts to force the members against tube 14 as the members are pressed into the sleeve element. Oppositely disposed set screws 22 in sleeve element 20 may be adjusted into securing or locking engagement with the respective clamping members 16, 18 to maintain the clamping members and the sleeve against relative movement.

In the Fig. 1 embodiment of the invention, the sleeve element 20 has an annular base flange 24 thereon for resting on the upper surface of the floor 10, and the flange may have thickness approximating the thickness of a linoleum or other floor covering 26 which may be neatly and smoothly fitted around the flange.

When necessary or desired, the opening 12 may be sealed around the tube 14 by a suitable litharge compound of dried lead and glycerine (not shown).

Ordinarily, it will be desirable to cover the tube and clamp, and it is a feature of the invention that the clamp has no projecting parts which cannot conveniently be accommodated within conventional pipe covering sections, one such fabric faced section of asbestos 28 being represented in Fig. 1, neatly and smoothly covering the tube and clamp. The clamping members and the sleeve element move with the tube when the latter expands and contracts, in the Fig. 1 embodiment.

When substantial expansion and contraction of the tube 14 is an important consideration in the supporting of the tube, it generally will be found desirable to employ the modified form of clamp shown in Fig. 2 wherein a separate relatively short cylindrical sleeve section 20a rests loosely on the previously described sleeve 20, and the clamping members 16, 18 are secured within sleeve section 20a by set screws 22 which, in this case, extend through the walls of sleeve section 20a. In other respects, the clamp of Fig. 2 may be the same as that of Fig. 1. However, when expansion of tube 14 occurs in the Fig. 2 embodiment, only the sleeve section 20a moves with the tube and clamping members 16, 18, the flanged sleeve 20 remaining in engagement with the floor.

In the embodiment of Fig. 4, a cylindrical sleeve 21 is set within an opening in a floor 10', of concrete or the like. Actually, the sleeve 21 usually will be placed prior to pouring of the concrete, and the concrete will be poured and set around the sleeve, so that sleeve 21 becomes secured in the floor by the concrete, and projects appreciably above the floor, as at 21'. In this case, the clamping members 16, 18 extend within the projecting portion 21' of the sleeve and are secured by set screws 22 which extend through the walls of the projecting sleeve portion 21'. Inasmuch as the sleeve 21, 21', is secured within the floor hole, and the clamping members 16, 18 and tube 14 are secured to the sleeve, no provision is made in the Fig. 4 embodiment for any appreciable expansion or contraction of tube 14. Hence, the Fig. 4 embodiment is recommended only in cases where the tube 14 will be subjected to no substantial temperature changes. However, it will be obvious that the Fig. 4 embodiment may be provided with the expansion and contraction feature of Fig. 2 merely by providing a separate sleeve section 20a for resting loosely on the projecting sleeve portion 21' in Fig. 4, and securing the clamping members 16, 18 within sleeve section 20a, as in Fig. 2.

It will be apparent from the foregoing description, in connection with the drawing, that I have provided a simple yet effective supporting pipe clamp which can securely clamp a pipe, and particularly a relatively deformable pipe or conduit of copper tubing, without the clamping pressure deforming the tube and without projecting clamp parts which cannot be effectively and smoothly covered in accordance with conventional pipe-covering procedures. Also, the clamp is conducive to the attainment of neat and smooth encircling by conventional floor coverings.

It is intended that the patent shall cover, by suitable expression in the appended claims, whatever features of patentable novelty exist in the invention disclosed.

I claim as my invention:

1. A pipe-supporting clamp comprising a cylindrical sleeve adapted to loosely surround a pipe which is to be supported, a pair of clamping members adapted to engage around substantially the total circumference of the pipe and to have surface engagement with the pipe throughout a relatively wide surface area in axial direction along the pipe, whereby pressure of said clamping members is distributed over said relatively wide surface area substantially all around the circumference of the pipe, said clamping members having exterior taper in said axial direction and having their smaller end portions enclosed within said sleeve and pressed within the sleeve into engagement with the walls of the sleeve whereby said clamping members become forced by the sleeve into clamping surface engagement with said pipe, and means on said sleeve for securing said clamping members and sleeve against relative movement when said clamping members are in clamping engagement with the pipe, said sleeve being adapted to engage at one of its ends against a relatively fixed abutment, and said smaller ends of the clamping members being insertible through the opposite end of the sleeve, and said securing means being adjacent to that end of the sleeve through which said smaller ends of the clamping members are insertible, whereby said clamping members and said securing means are at the same side of said relatively fixed abutment.

2. A pipe-supporting clamp comprising a cylindrical sleeve for loosely surrounding the pipe and adapted to rest loosely against a relatively fixed abutment, opposed clamping members adapted to engage around substantially the total circumference of the pipe and to have surface engagement with the pipe throughout a relatively wide surface area in axial direction along the pipe, whereby pressure of said clamping members is distributed over said relatively wide surface area substantially all around the circumference of the pipe, said clamping members having exterior taper in said axial direction and having their smaller end portions enclosed within said sleeve and pressed within the sleeve into engagement with the sleeve walls whereby said clamping members become forced by the sleeve into clamping surface engagement with said pipe, and oppositely disposed set screws on said sleeve, each adapted to engage a different one of said clamping members, whereby said clamping members and sleeve may be secured by said set screws against relatitve movement when said clamping members are in clamping engagement with the pipe, said smaller end portions of the clamping members being insertible through the outer end of said cylindrical sleeve which is opposite its end which rests against said relatively fixed abutment, and said set screws being adjacent to said outer end of the sleeve, whereby said clamping members and said set screws are at the same side of said relatively fixed abutment.

3. A pipe-supporting clamp comprising two cylindrical sleeve elements adapted to be arranged in loosely engaging end to end relation in loosely surrounding relation to a pipe which is to be supported, opposed clamping members adapted for engaging substantially all around the circumference of said pipe throughout a substantial distance axially of the pipe, said clamping members having exterior taper in axial direction and being wedged within one of said sleeve elements, the other of said sleeve elements being adapted to engage endwise against a relatively fixed abutment, and means securing said clamping members to that sleeve element within which it is wedged, whereby said sleeve elements and clamping members may be associated together on the pipe and the pipe clamped and secured at the same side of said relatively fixed abutment, and one of said sleeve elements and said clamping members wedged and secured therein can move in unison with said pipe relative to the other sleeve element when said pipe expands in axial direction.

4. A pipe clamp comprising two cylindrical sleeve elements adapted to be arranged in loosely engaging end to end relation in loosely surrounding relation to a pipe which is to be clamped, one of said sleeve elements being adapted to be supported in a fixed position and the other being movable relative to the fixed sleeve element, a pair of oppositely disposed clamping members engaging substantially all around the circumference of said pipe throughout a substantial distance axially of the pipe, said clamping members having exterior taper and their smaller ends being forced into enclosed and engaged relation within said movable sleeve element, whereby the movable sleeve element forces said clamping members into clamping engagement with said pipe, and means securing the clamping members and said movable sleeve element against relative movement whereby said clamping members, movable sleeve element and said pipe can move in unison relative to said fixed sleeve element when said pipe expands in axial direction, said clamping members, securing means and movable sleeve being entirely at one side of said fixed sleeve.

CLAYTON B. WRIGHT.

References Cited in the file of this patent
UNITED STATES PATENTS

| Number | Name | Date |
|--------|------|------|
| 312,193 | Duffy | Feb. 10, 1885 |
| 1,835,155 | Harbert | Dec. 8, 1931 |